3,446,851
PRODUCTION OF 2-HYDROXY-2,3-DIHYDROCITRAL
Kurt Schneider, Limburgerhof, Pfalz, and Heinrich Pasedach and Horst Pommer, Ludwigshafen am Rhine, Germany, assignors to Badische Anilin- & Soda-Fabrik Aktiengesellschaft, Ludwigshafen am Rhine, Germany
No Drawing. Filed July 24, 1964, Ser. No. 385,084
Claims priority, application Germany, July 30, 1963, B 72,917
Int. Cl. C07c 45/04, 45/00
U.S. Cl. 260—602            3 Claims

ABSTRACT OF THE DISCLOSURE

Production of 2-hydroxy-2,3-dihydrocitral by adding primary or secondary saturated alcohol to triple bond of 2,2,6-trimethyl-6-ethinyltetrahydropyrane and splitting of resultant vinyl ether in an acidic aqueous medium at 0–160° C.

---

This invention relates to a process for the production of 2-hydroxy-2,3-dihydrocitral. In accordance with a prior art method, this compound may be prepared by oxidation of 2-hydroxydihydrolinaool with potassium dichromate or by dehydrogenation of 2-hydroxydihydrogeraniol.

It is the object of the present invention to provide a process for the manufacture of said substance which is easier to carry out and gives higher yields. This object is achieved by adding on to the triple bond of 2,2,6-trimethyl-6-ethinyltetrahydropyrane (I) a primary or secondary saturated alcohol, and splitting the resultant vinyl ether (II) by keeping it in aqueous-acid medium at a temperature of between 0° and 160° C., advantageously between 40° and 100° C., to form 2-hydroxy-2,3-dihydrocitral (III).

The reaction according to this invention may be represented by the following equation:

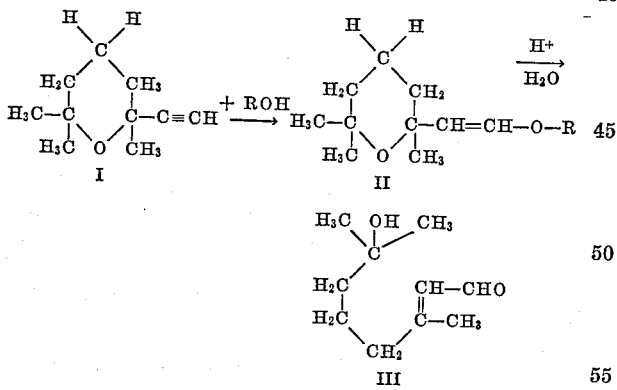

It is surprising that the vinyl ether (II) can be cracked under such mild conditions that the 2-hydroxy-2,3-dihydrocitral (III) is not changed or is not changed to an appreciable extent. It is known from Compt. rend., volume 252, page 1330 (1961), Bull. Soc. Chim. France (V), volume 8, page 369 (1941), J. Am. Soc., volume 70, page 1311 (1948) and volume 69, page 2581 (1947), that the pyrane ring is normally opened only under very much more energetic conditions than obtain in the process according to this invention. Under such conditions 2-hydroxy-2,3-dihydrocitral, being a tertiary alcohol having aldehyde function, is not stable.

The initial material (I) of the process according to this invention may be prepared in known manner by cyclization of dehydrolinalool in an acid medium (cf. Rupe and Lang, Helvetica Chemica Acta, volume 12 (1929), page 1136).

In the first stage of the process according to this invention, a primary or secondary saturated alcohol (i.e. an alcohol not containing olefinic or acetylenic bonds) is added on to the acetylenic bond of the initial material (I) by a conventional method. Alcohols of the aliphatic, cycloaliphatic, araliphatic and heterocyclic series are suitable. It is preferred to use monohydric or dihydric saturated aliphatic alcohols having one to six carbon atoms which, apart from the hydroxyl group or groups, have hydrocarbon structure or additionally bear an ether bridge. Examples of alcohols of this type are methanol, ethanol, butanol, methyl glycol, butyl glycol, tetrahydrofurfuryl alcohol and ethylene glycol. Other suitable alcohols are lauryl alcohol, cyclohexanol, benzyl alcohol, β-phenylethyl alcohol, and glycerol. The alcohol is advantageously used in at least the stoichiometric amount. It is advantageous to use a considerable excess of alcohol, for example a 2-molar to 20-molar amount. When polyhydric alcohols are used, reaction with one alcohol function or several alcohol functions may be favored by appropriate choice of the relative proportions.

The first stage of the process according to this invention is carried out under conventional vinylation conditions and with conventional vinylation catalysts, for example alkali metals or alkaline earth metals or their oxides, hydroxides, alcoholates or amides; tetrasubstituted ammonium hydroxides and strongly basic ion exchangers are also suitable as catalysts. Zinc and cadmium salts of organic acids, particularly of fatty acids having eight to twenty carbon atoms, are also known to be suitable as vinylation catalysts. The vinylation catalysts are advantageously used in amounts of 0.05 to 10% by weight with reference to the initial material (I). The reaction temperature is 100° to 250° C., preferably 160° to 220° C. The reaction in the first stage of the process may be carried out continuously or batchwise. The vinyl ether (II) is obtained from the reaction mixture by distillation, possibly together with excess alcohol and/or unreacted initial material (I).

In the second stage of the process according to this invention, the vinyl ether (II) is split at both ether bridges in aqueous-acid medium. An amount of water is used which is at least equivalent to the stoichiometric ratio. In the interests of a good yield of pure product, it is advantageous to use an excess of 1.5 to 15 times. Medium strength to strong mineral acids or organic sulfonic acids, such as phosphoric acid, hydrochloric acid, hydroiodic acid, sulfuric acid and p-toluenesulfonic acid, are particularly suitable acid reagents. Strongly acid ion exchangers and acid-activated bleaching earths may also be used. Finally Friedel-Crafts catalysts, such as zinc chloride, aluminum chloride, titanium tetrachloride and boron fluoride, may be used which under the reaction conditions decompose into hydrolysis products which in turn are catalytically active. The amounts in which the acid reagents are used depend inter alia on the reaction temperature and on the type of acid reagent. It is advantageous to use an amount of acid reagent which is about from 0.01 to 10% by weight with reference to water. Good results are achieved for example by using 0.01 to 2 N sulfuric acid as the aqueous-acid medium. The concentration and reaction temperature required for a given acid may readily be so adjusted as to ensure that the product is not changed in any way, for example dehydrated or oxidized.

Inert solvents and diluents may be added for the reaction which may be carried out in homogeneous or heterogeneous phase. Examples of suitable inert solvents or diluents are methanol, ethanol, acetone and dioxane.

2-hydroxy-2,3-dihydrocitral is recovered from the reaction mixture by distillation. It is distinguished by an odor similar to cyclamen with a slight citrus note. It is therefore suitable as a component of perfume compositions, 2-hydroxy-2,3-dihydrocitral may also be selectively hydrogenated in contact with palladium catalysts to form 2-hydroxy-2,3-dihydrocitronellal which is also a valuable perfume. Hitherto 2-hydroxy-2,3-dihydrocitronellal has been prepared in moderate yields from a natural product, namely citronellol, having the formula

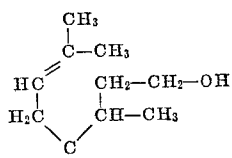

The invention will be further illustrated by the following examples. The parts given in the following examples are parts by weight, unless stated otherwise. Parts by weight bear the same relation to parts by volume as the gram to the ccm.

Example 1

1,000 parts of 2,2,6-trimethyl-6 - ethinyltetrahydropyrane, 500 parts of methanol and 25 parts of potassium hydroxide are heated for fifteen hours at 200° C. in an autoclave having a capacity of 3,000 parts by volume and fitted with stirring means. The reaction mixture is distilled. Excess methanol, 465 parts of unreacted 2,2,6-trimethyl-6-ethinyltetrahydropyrane having the boiling point 52° C. (15 mm. Hg) and 630 parts of 2,2,6-trimethyl-6-(2'-methoxyvinyl)-tetrahydropyrane having a boiling point of 48° to 85° C. (15 mm. Hg) and a refractive index $n_D^{20}=1.4580$ are obtained.

1,000 parts of this product is heated with 250 parts of 0.1 N sulfuric acid for twenty minutes at 60° C. while stirring. The product is cooled, the sulfuric acid is neutralized by adding solid sodium hydrogen carbonate, the aqueous layer is separated and the organic phase is distilled over a short column. 225 parts of 2,2,6-trimethyl-tetrahydropyranyl-(6)-acetaldehyde having a boiling point of 75° to 78° C. (14 mm. Hg) and a refractive index of $n_D^{20}=1.4470$, 595 parts of 2-hydroxy - 2,3 - dihydrocitral having a boiling point of 108° to 110° C. (0.4 mm. Hg) and a refractive index of $n_D^{20}=1.4850$ and 45 parts of 2,6-dihydroxy-2,3-dihydrocitronellal having a boiling point of 145° to 150° C. (0.4 mm. Hg) and a refractive index $n_D^{20}=1.5020$ are obtained.

The two stages of the process may be modified as follows: (1) Reaction of the initial material (I) with methanol using different vinylation catalysts: 500 parts of 2, 2,6-trimethyl - 6 - ethinyltetrahydropyrane, 500 parts of methanol and 20 parts of sodium methylate are heated for 20 hours at a temperature of 200° C. in an autoclave lined with titanium. By distillation, 212 parts of unreacted initial material and 296 parts of vinyl ether of the boiling point 88° to 91° C. (20 mm. Hg) and the refractive index $n_D^{20}=1.4584$ are obtained.

When using 25 parts of potassium methylate instead of sodium methylate, practically the same results are obtained.

When using zinc acetate, zinc stearate, magnesium oxide and calcium oxide in equivalent amounts, the yields are practically the same, but the conversions are only about 10%.

(2) Reaction of the initial material (I) with other alcohols: 1,000 parts of 2,2,6-trimethyl-6-ethinyltetrahydropyrane, 1,000 parts of an alcohol and 50 parts of potassium hydroxide are heated for 20 hours at a temperature of 220° to 240° C. in an autoclave lined with titanium. When using the following alcohols, vinyl ethers having the following characteristics are obtained by distillation:

| Alcohol | $Kp_{20}$(° C.) | $n_{d20}$ |
|---|---|---|
| $CH_3-O-CH_2CH_2-OH$ | 130-132 | 1.4598 |
| $CH_3-CH_2-CH_2-CH_2-OH$ | 131 | 1.4574 |
| $(CH_3)_2CH-CH_2-OH$ | 128 | 1.4552 |

(3) Splitting of the vinyl ether under different reaction conditions; 500 parts of 2,2,6-trimethyl-6-(2'-methoxyvinyl)-tetrahydropyrane, 500 parts of water and 100 parts of nuclear-sulfurated polystyrene as marketed under the trade name of Lewatit S100 are agitated intensely for an hour at 80° C. The product is allowed to cool, the strongly acid ion exchanger filtered off, the filtrate saturated with common salt and the organic layer separated. By distillation, 174 parts of 2-hydroxy-2,3-dihydrocitral is obtained.

400 parts of the same vinyl ether and 200 parts of 0.1 N aqueous hydrochloric acid are stirred for 30 minutes at 80° C. The organic layer is separated, washed neutral with sodium methylate and then with water, and subsequently distilled. 218 parts of 2-hydroxy-2,3-dihydrocitral of the boiling point 112° to 116° C. (0.5 mm. Hg) and the refractive index $n_D^{20}=1.4885$ is obtained.

3,200 parts of the same vinyl ether and 800 parts of 0.1% aqueous phosphoric acid are stirred for 90 minutes at 60° C. Upon cooling, the entire mixture is neutralized with sodium methylate solution and fractionated. 1,765 parts of 2-hydroxy-2,3-dihydrocitral passes over at 116° to 125° C. (1.8 mm. Hg).

200 parts of the same vinyl ether, 100 parts of water and 0.2 part of p-toluenesulfonic acid are heated for 30 minutes at 80° C. By working up and distillation, 106 parts of 2-hydroxy-2,3-dihydrocitral is obtained.

Example 2

Hydrogen is introduced into a mixture of 510 parts of 2-hydroxy-2,3-dihydrocitral, 1,000 parts of acetic acid and 50 parts of a palladium catalyst (0.3% palladium on silica gel) with intense agitation at 55° to 60° C. until no more gas is absorbed. The catalyst is filtered off and the solvent removed by distillation. The residue is fractionated over a short column. 432 parts of 2-hydroxy-2,3-dihydrocitronellal having the boiling point 88° to 90° C. (0.5 mm. Hg) and the refractive index $n_D^{20}=1.4492$ is obtained.

We claim:

1. A process for the production of a hydroxy citral of the structure

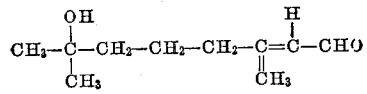

which comprises adding on an alcohol selected from the group consisting of primary and secondary saturated alcohols to the triple bond of 2,2,6-trimethyl-6-ethinyltetrahydropyrane to produce a vinyl ether of the formula

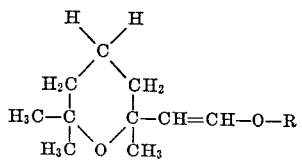

and splitting the resultant vinyl ether in aqueous-acid medium at a temperature of from 0° to 160° C. to split said vinyl ether at both ether bridges and form said hydroxy citral compound.

2. A process as claimed in claim 1 wherein the splitting is carried out at from 40° to 100° C.

3. A process as claimed in claim 1 wherein the alcohol is used in from 2-molar to 20-molar amount with respect to 2,2,6-trimethyl-6-ethinyltetrahydropyrane.

References Cited

UNITED STATES PATENTS

| | | | |
|---|---|---|---|
| 2,533,172 | 12/1950 | McKinley | 260—584 |
| 2,404,700 | 7/1946 | Evans | 260—347.8 |
| 2,066,076 | 12/1936 | Reppe et al. | 260—584 |

BERNARD HELFIN, *Primary Examiner.*

R. H. LILES, *Assistant Examiner.*

U.S. Cl. X.R.

260—345.1